No. 725,736. PATENTED APR. 21, 1903.
J. MARION.
HORSESHOE.
APPLICATION FILED SEPT. 18, 1902.
NO MODEL.

Witnesses:
Joseph Marion, Inventor,
By Marion & Marion
Attorneys

UNITED STATES PATENT OFFICE.

JOSEPH MARION, OF HOLYOKE, MASSACHUSETTS.

HORSESHOE.

SPECIFICATION forming part of Letters Patent No. 725,736, dated April 21, 1903.

Application filed September 18, 1902. Serial No. 123,827. (No model.)

*To all whom it may concern:*

Be it known that I, JOSEPH MARION, a subject of the King of Great Britain, residing at Holyoke, county of Hampden, State of Massachusetts, have invented certain new and useful Improvements in Horseshoes; and I do hereby declare that the following is a full, clear, and exact description of the invention, such as will enable others skilled in the art to which it appertains to make and use the same.

My invention relates to nailless horseshoes, and my object is to produce a horseshoe which can be solidly attached to the horse's foot without the use of nails or otherwise breaking or injuring the hoof of the horse and to avoid the many ill consequences that are induced by the common form of shoe.

In my improved shoe no nails are employed, and the hoof is therefore preserved entire, and, moreover, may be removed and replaced with the greatest ease whenever necessary.

My invention consists in the arrangement and combinations hereinafter described, and shown in the accompanying drawings, in which—

Figure 1:
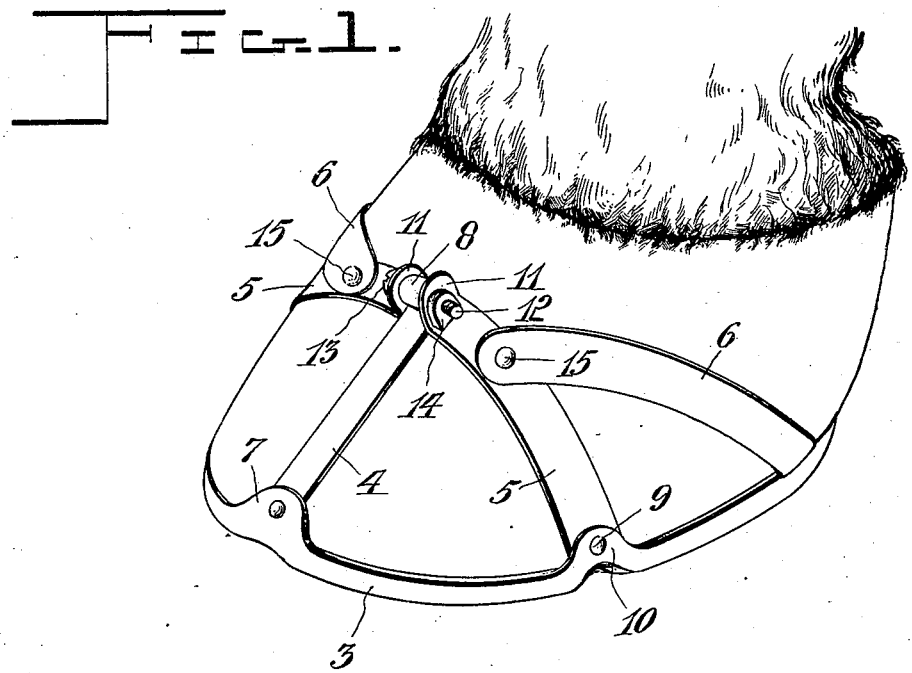
Figure 2:
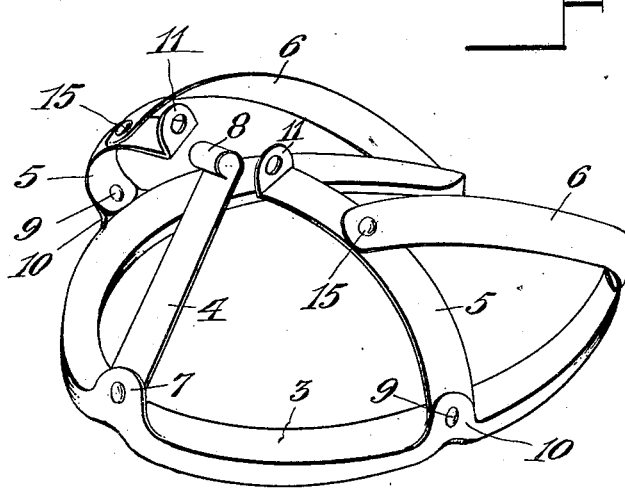

Figure 1 is a perspective view of my improved shoe as applied to a horse's hoof. Fig. 2 is a perspective of the shoe removed from the hoof.

The same numerals of reference denote like parts in both figures of the drawings.

The shoe embodies an ordinary curved sole-piece 3 of the usual form, adapted to surround the outer margin of the lower surface of the hoof and on which the same is adapted to rest. To the outer margin of this sole are attached at five different points thereof three sets of straps, designated, respectively, 4, 5, and 6. The single strap 4 is riveted to an ear 7, rising from the front extremity or toe of the sole, and its upper end is formed with a recurved hook or eye 8. The intermediate straps 5 are likewise attached, by means of rivets 9, to a pair of ears 10 at the sides of the shoe, and these straps extend up around the front portion of the hoof to meet each other in the center, where they have a pair of upstanding apertured ears 11, through which and through the eye 8 passes a small bolt 12, which secures the shoe together on the foot of the horse, this bolt having, preferably, a screw-head 13 and a D-shaped lock-nut 14, which is prevented from turning by striking against the body of the strap 5. The rear pair of straps 6 are likewise connected to the extremities of the sole 3 and extend around the lateral portions of the hoof and are riveted at their ends to the straps 5 near the upper ends of the latter, as shown at 15.

The mode of attachment is readily seen, this being simply the insertion of the hoof between the straps 4, 5, and 6 and the setting of the bolt 12 in place. The shoe is held in position with the utmost security, and yet it can be readily removed and replaced by any one, so that the necessity of a blacksmith is dispensed with. Moreover, in the cases of horses having sore or tender feet these shoes can be removed every evening, if desired, or whenever the horse is turned out to pasture.

It may be observed that the straps 4, 5, and 6 should be made of the best materials, preferably spring-steel, which will render them less apt to break and make the shoe easier to be inserted and replaced.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim as new, and desire to secure by Letters Patent, is—

1. A horseshoe comprising a sole portion of horseshoe form, a pair of intermediate side straps secured to the sides of the sole and adapted to be secured at their ends over the upper side of the hoof of the horse, and a pair of lateral straps secured to the rear ends of the sole at one end and to said side straps at the other end, substantially as described.

2. A horsehoe comprising a sole portion of horseshoe form, a pair of intermediate side straps secured to the sides of the sole and adapted to be secured at their ends over the upper side of the hoof of the horse, a pair of lateral straps secured to the rear ends of the sole at one end and to said side straps at the other end, and a toe-strap 4 secured at the central front portion of the sole at one end and to the junction of said side straps at the other end, substantially as described.

3. A nailless horseshoe comprising a sole portion adapted to underlie the hoof of the horse, a pair of lateral straps secured at intermediate points of the sole portion at the outer edge thereof and adapted to extend over the hoof of the horse, a pair of apertured ears formed at the free ends of said side straps, a bolt adapted to pass through said ears and to secure them together, and a pair of lateral straps secured at their rear ends to the rear of the sole portion and at their forward ends to said side straps, substantially as described.

4. A nailless horseshoe comprising a sole portion adapted to underlie the hoof of the horse, a pair of lateral straps secured at intermediate points of the sole portion at the outer edge thereof and adapted to extend over the hoof of the horse, a pair of apertured ears formed at the free ends of said side straps, a bolt adapted to pass through said ears and to secure them together, a pair of lateral straps secured at their rear ends to the rear of the sole portion and at their forward ends to said side straps, and a toe-strap extending from the central outer portion of the sole to the junction of said side straps, and having an eye through which said bolt passes, substantially as described.

In witness whereof I have hereunto set my hand in the presence of two witnesses.

JOSEPH MARION.

Witnesses:
  W. J. HOWES,
  THOMAS STANSFIELD.